United States Patent [19]

Iyeta

[11] 4,139,200
[45] Feb. 13, 1979

[54] APPARATUS FOR SUPPORTING A PICKUP ARM ON A DISC PLAYER

[75] Inventor: Motoi Iyeta, Hamakita, Japan
[73] Assignee: Nippon Gakki Seizo Kabushiki Kaisha, Japan
[21] Appl. No.: 789,515
[22] Filed: Apr. 21, 1977
[30] Foreign Application Priority Data Apr. 27, 1976 [JP] Japan .................................. 51-48323

[51] Int. Cl.² .............................................. G11B 3/10
[52] U.S. Cl. ................................................ 274/23 A
[58] Field of Search ............................ 274/23 R, 23 A

[56] References Cited

U.S. PATENT DOCUMENTS

| 3,093,379 | 6/1963 | Fabel et al. | 274/23 R |
|---|---|---|---|
| 3,675,932 | 7/1972 | Rabinow | 274/23 A |
| 4,007,939 | 2/1977 | Iyeta | 274/23 A |
| 4,032,158 | 6/1977 | Smith et al. | 274/23 A |
| 4,033,591 | 7/1977 | Ichikawa | 274/23 R |

Primary Examiner—Steven L. Stephan
Attorney, Agent, or Firm—Ostrolenk, Faber, Gerb & Soffen

[57] ABSTRACT

A disc player in which a servo-driven carriage supporting a pickup arm assembly via a block mounted thereon is movable along a linear path substantially normal to an imaginary radial line of a disc turntable, the level of the block being adjustable as required relative to the carriage. A gimbal support mechanism, a pickup arm lifting mechanism, a pickup arm offset angle detecting mechanism and a pickup arm positioning mechanism are all encased within the block, thereby assuring a compact construction, successful slashing of noisy vibrations of mechanical parts conventionally causing lowering of reproduction quality and simple adjustment after replacement of mechanical parts.

13 Claims, 13 Drawing Figures

APPARATUS FOR SUPPORTING A PICKUP ARM ON A DISC PLAYER

BACKGROUND OF THE INVENTION

The present invention relates to an apparatus for supporting a pickup arm on a disc or record player, and more particularly relates to improvement in supporting and adjusting structures for a pickup arm assembly on audio and/or video disc players of the linear tracking type.

In the conventional disc player of the type utilizing a linear tracking arm, a servo-driven carriage for supporting the pickup arm assembly is movable on and along a track in a direction normal to the radial direction of a turn table to compensate deviation of the pickup arm from true tangency to a record groove to be reproduced. The player is further provided with, among other elements, a pickup arm lifting mechanism, a pickup arm offset angle detecting mechanism, a gimbal support mechanism and other elements arranged on the carriage. These mechanisms are, in general, separated from each other and are operatively coupled to each other via a number of mechanical connecting elements such as links. As a result of the large number of connecting elements the structure is quite complicated and is relatively large. In addition, the structure tends to cause generation of noisy mechanical vibration which seriously reduces the reproduction quality of the disk player. Further, the complicate connecting structure often lowers the operative reliability of the entire mechanism. Finally, the separate arrangement of the mechanisms makes it very difficult to properly adjust the mechanisms after replacement of any mechanical part or parts.

OBJECTS OF THE INVENTION

It is an object of the present invention to provide a simplified and compact supporting apparatus for a pickup arm of a disc player.

It is another object of the present invention to provide a support apparatus for a pickup arm which successfully avoids generation of vibration, thereby assuring improved reproduction quality.

It is the other object of the present invention to provide a supporting apparatus for a pickup arm which exhibits excellent operative reliability.

It is a further object of the present invention to provide a supporting apparatus for a pickup arm which enables simple and easy adjustments of mechanisms after replacement of any mechanical parts.

It is a further object of the present invention to provide a supporting apparatus for a pickup arm of considerably reduced production cost.

SUMMARY OF THE INVENTION

In accordance with the present invention, the support mechanism, the pickup arm lifting mechanism, the pickup arm offset angle detecting mechanism and the pickup arm positioning mechanism are all arranged substantially within a common block mounted atop the carriage and the level of this block is adjustable relative to the carriage.

DETAILED EXPLANATION OF THE PREFERRED EMBODIMENT

Figure 1:
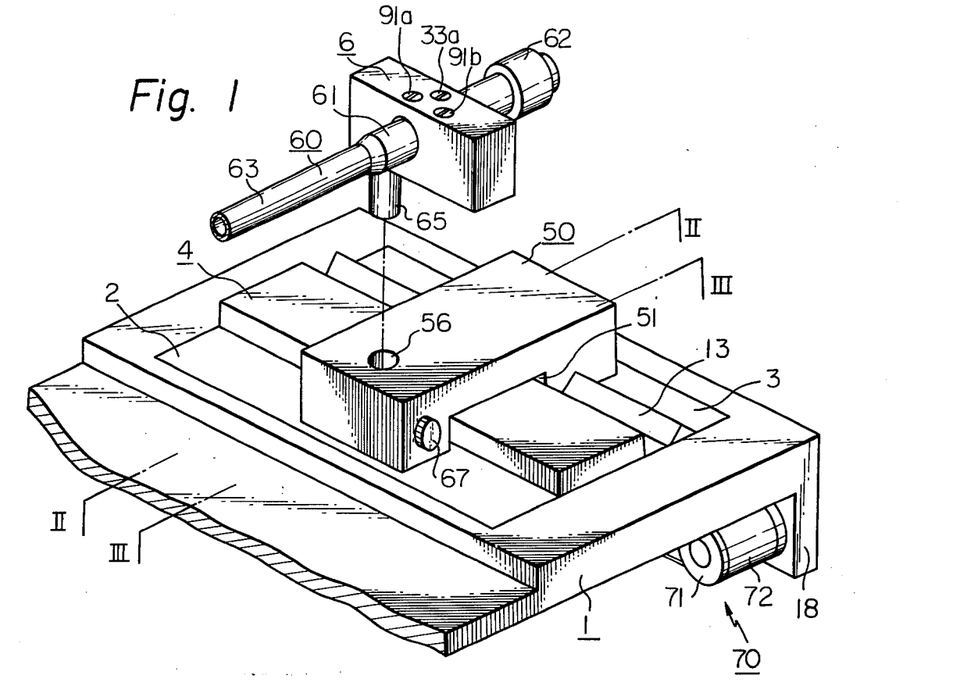
FIG. 1 is a perspective view of an embodiment of the apparatus in accordance with the present invention with the pickup arm shown in exploded fashion, and in which portions of the disc player have been omitted for purposes of simplicity.
Figure 2:
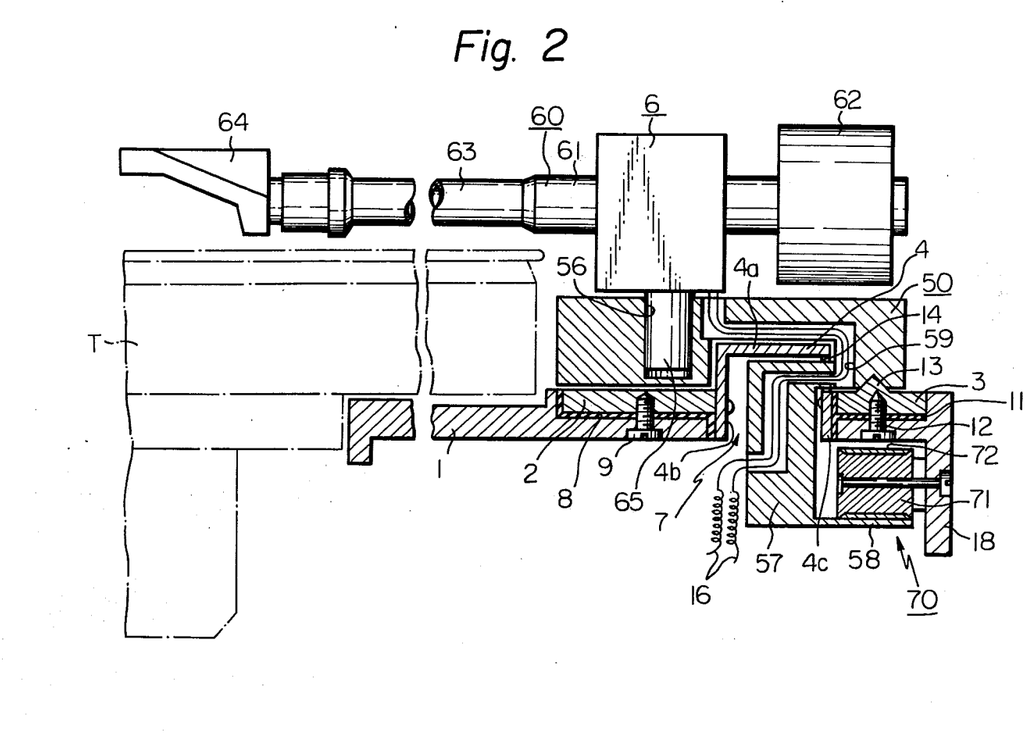
FIG. 2 is a sectional view taken along the line II—II in FIG. 1 with the exception that the driving mechanism is shown in sectional fashion.
Figure 3:
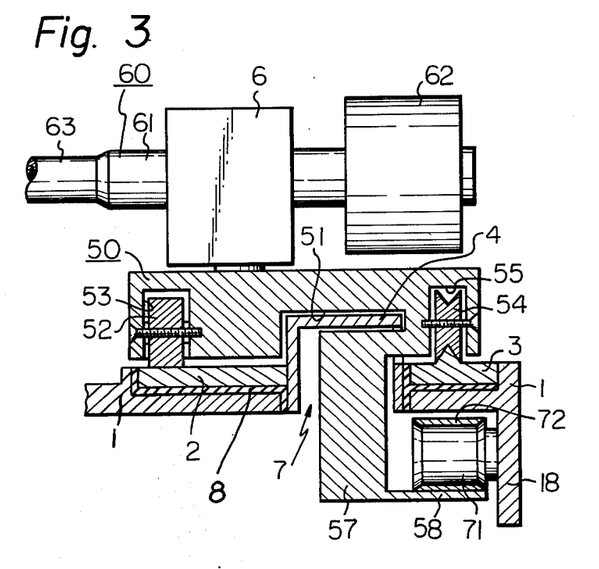
FIG. 3 is a sectional view taken along the line III—III in FIG. 1.

An embodiment of the apparatus in accordance with the present invention is shown in FIGS. 1 through 3, in which the present invention is applied to an audio disc player. The apparatus comprises, as major elements, a horizontally arranged base member 1, a pair of parallel guide rails 2 and 3 arranged atop the base member 1, an elongated cover 4 arranged parallel to and between the guide rails 2 and 3 while projecting at a slight angle above the top surface of the base member 1, a carriage 50 arranged so as to ride over and move along the cover 4 and the guide rails 2 and 3, a pickup arm supporting block 6 adjustably mounted on the carriage 50 and adapted for supporting a tone arm assembly 60 and its related parts, and a driving mechanism 70 for the carriage 50 and arranged below the base member 1. The pair of guide rails 2 and 3 and the elongated cover 4 extend substantially at a right angle viewed in FIG. 2, to the desired orientation of the pickup arm assembly 60. The location of the turntable T is shown in phantom in FIG. 2. In accordance with the present invention, the pickup arm supporting block 6 encases a gimbal support mechanism 30 (FIG. 4), a pickup arm lifting mechanism 40 (FIG. 7), a pickup arm offset angle detecting mechanism 80 (FIG. 7) and a pickup arm positioning mechanism 90.

Referring to FIG. 2, a relatively wide vertical slit 7 is formed through the base member 1 extending in the moving direction of the carriage 50. One of the guide rails, i.e. the front guide rail 2 is fixed to the top surface of the base member 1 via a suitable shock absorving layer 8, which is preferably formed of a resilient material such as rubber, by set screws 9 (only one of which is shown) on the front side of the vertical slit 7. The other of the guide rails, i.e. the back guide rail 3, is likewise fixed to the top surface of the base member 1 via a similar shock absorving layer 11 by set screws 12 (only one of which is shown) on the back side of the vertical slit 7. In the case of the illustrated embodiment, the back guide rail 3 is provided with an elongated projection 13 which extends in the moving direction movement of the carriage 50. Both guide rails 2 and 3 are preferably so arranged that the main top surfaces thereof are substantially flush with each other.

The elongated cover 4 is made of a channel-shaped metal or resin material and comprises an upper horizontal rim 4a, a front rim 4b and a back rim 4c the latter two of which extend downwardly, at a right angle, from the horizontal rim 4a (see FIG. 2). The front rim 4b is fixed to the back face of the front guide rail 2 via suitable set screws and the back rim 4c is likewise fixed to the front face of the back guide rail 3 via suitable set screws. Thus, except for the lower portions of the front and back rims 4b and 4c, the major portion of the cover 4 projects from the top surface of the guide rails 2 and 3. The cover 4 is provided with a horizontal slit 14 formed through the back rim 4c thereof for the purposes hereinafter described and this horizontal slit 14 extends at least over the entire moving ambit of the carriage 50 along the elongated cover 4.

Referring now to FIG. 3, the bottom of the carriage 50 is provided with a horizontal through opening or cut-out 51 formed in the direction of movement thereof and by way of which the carriage 50 spacedly and movably rides upon the elongated cover 4. On the front side of the horizontal opening 51, two or more sets of wheels 52 are rotatably journaled in respective recesses 53 formed in the bottom surface of the carriage 50, with their axes being arranged substantially at a right angle to the moving direction of the carriage 50. In a similar fashion, two or more sets of wheels 54 are rotatably journaled in respective bottom recesses 55 with the exception that these wheels 54 are provided with peripheral grooves adapted to snuggly engage the projection 13 of the back guide rail 3. As the carriage 50 moves along the cover 4, the wheels 52 and 54 roll on and along the respective guide rails 2 and 3. Due to the engagement of the peripheral grooves of the back wheels 54 with the projection 13 of the back guide rail 3, the position of the carriage 50, normal to the moving direction thereof, is always maintained constant. The diameters of the wheels 52 and 54 should be so chosen that the bottom surface of the carriage 50 does not slide in contact with the top surfaces of the guide rails 2 and 3.

As a substitute for the projection 13 on the back guide rail 3, a similar projection may be made on the front guide rail 2 and, in this case, the front wheels 52 should be provided with peripheral grooves snugly engageable with the projection and the back wheels 54 are provided with flat peripheral surfaces. When extremely reliable positioning of the carriage 50 in the direction normal to its moving direction is required, projections may be provided on both guide rails 2 and 3 and peripheral grooves may be formed on both side wheels 52 and 54.

As a further variant, a straight guide groove may be formed in the top surface of at least one of the guide rails 2 and 3 and, in such a case, annular projections may be formed on the peripheral surfaces of the corresponding side wheels 52 or 54, the projections being snuggly received and rolling in the grooves as the carriage 50 moves.

As shown in FIGS. 1 and 2, a vertical hole 56 is formed in the top surface of the carriage 50 for the mounting of the pickup arm supporting block 6 as explained in more detail below.

As can be seen in FIG. 3, the carriage 50 is provided with a bottom block 57 which extends, from a bottom portion near the back wheels 54, into the inner cavity of the cover 4 through the back side horizontal slit 14 of the cover 4. The block 57 bends and extends downwardly beyond the bottom surface of the base member 1 and again bends rearwardly in order to form a horizontal bottom rim 58.

A bent passageway 59 (see FIG. 2) is formed through the upper body of the carriage 50 and its bottom block 57 in order to permit the passage of a plurality of lead wires 16 (only two of which are illustrated) which connect a phonographic pickup cartridge (not shown) and other electric systems located in the pickup arm supporting block 6 to a external electric circuit (not shown).

Figure 9:
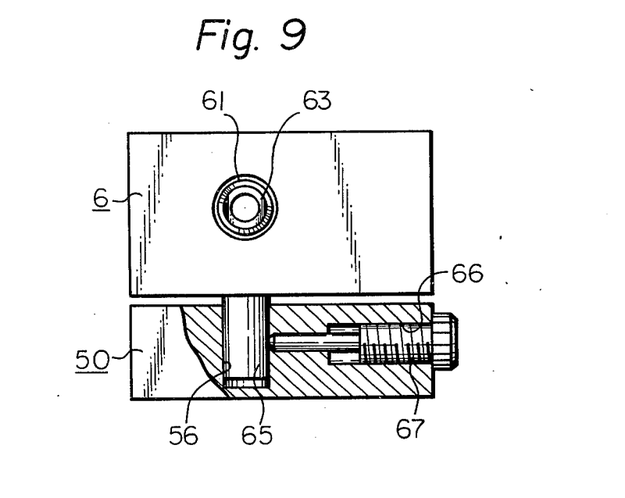
FIG. 9 is a partly sectional front view of an arrangement for adjusting the level of the pickup arm supporting block.
Figure 10:
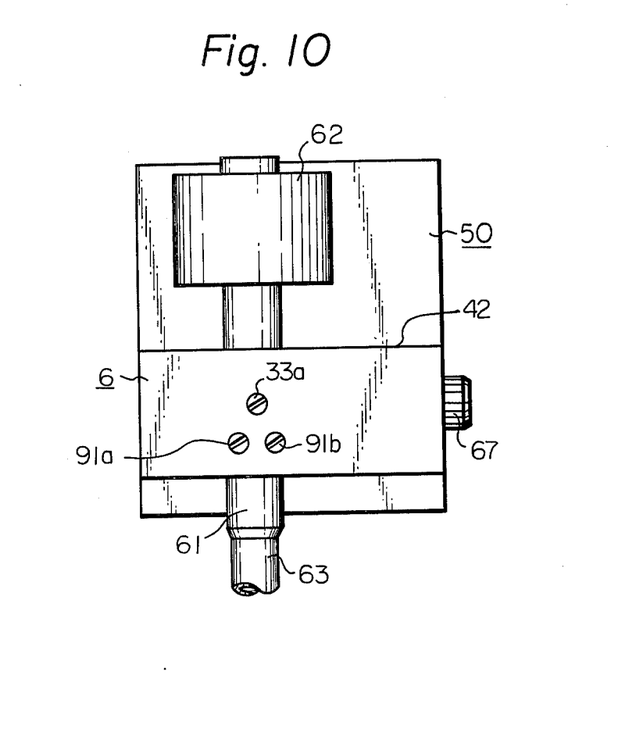
FIG. 10 is a top view of the supporting block and its related parts.

The pickup arm assembly 60 comprises a pickup arm end 61 having a circular cross section and being rockably supported in the supporting block 6, a pickup arm 63 (extending forwardly over the turn table T from the pickup arm end 61), a head shell 64 (mounted on the front end of the pickup arm 63 and receiving the pickup cartridge), and a counter weight 62 (mounted near the rear end of the pickup arm end 61). The supporting block 6 is provided with a projection 65 which is inserted into the vertical hole 56 of the carriage 50. The outer diameter of the projection 65 is slightly smaller than the diameter of the hole 56. A threaded hole (see FIG. 9) is formed in the carriage 50 substantially at a right angle to the vertical hole 56 and a fastening screw 67 is screwed into the threaded hole 66 so that, when fastened, the toe point of the screw 67 presses the projection 65 against the inner wall of the hole 56, thereby fixing the latter in the hole 56. Thus, the relative vertical position of the supporting block 6 to the carriage 50 is adjustable as required.

The base member 1 is provided at the rear end thereof with a downwardly extending vertical rim 18 which rotatably carries a pair of mutually spaced pulleys 71 of the driving mechanism 70. The distance between the axes of the pair of pulleys 71 should be at least as long as the moving ambit of the carriage 50. A closed loop belt 72 is entrained around the pulleys 71 in direction of movement of the carriage 50. Belt 72 may be fixed by any suitable fastening means at any suitable portion along the length thereof to the top surface of the bottom rim 58 of the bottom block 57 of the carriage 50 so that running of the belt 72 causes corresponding movement of the carriage 50 along the cover 4 and the guide rails 2 and 3. Alternatively, the drive may be obtained by frictional engagement between the belt 72 and the rim 58 of the carriage 50.

Figure 4:
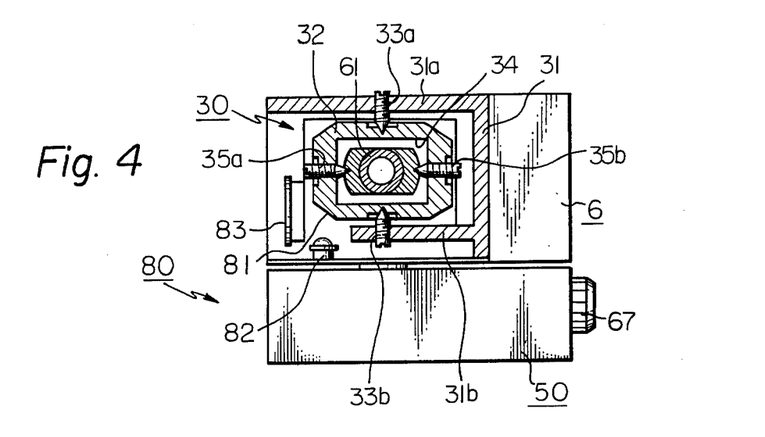
FIG. 4 is a partly sectional front view of the gimbal support mechanism used in the apparatus shown in FIG. 1.

One of the pulleys 71 is coupled to the output shaft of a servo-motor (not shown) which is electrically and operationally coupled, via a suitable amplifier, to the pickup arm offset angle detecting mechanism 80 (FIG. 4). Preferably this motor also serves to feed the pickup arm 63 in accordance with reproduction of the record groove and for returning the arm to its initial inoperative position located aside the turntable T.

In a modified embodiment of the present invention, the vertical rim 18 of the base member 1 may be omitted, the pulleys 71 may be disposed at the bottom surface of the base member 1 with their axes being arranged in the vertical direction and the belt 72 running around the pulleys 71 may be fixed, at a suitable portion along the length thereof, to one of the side faces of the bottom block 57 of the carriage 50. In any case, the construction is so arranged that running of the belt 72 driven by the servo-motor should cause corresponding movement of the carriage 50 along the cover 4 and the guide rails 2 and 3 as a result of the engagement of the belt 72 with the bottom block 57 of the carriage 50.

Figure 5:
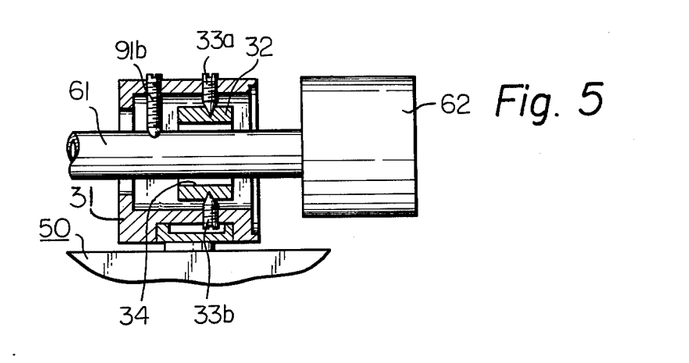
FIG. 5 is a partly sectional side view of the gimbal support and pickup arm positioning mechanisms used in the apparatus shown in FIG. 1, FIG. 6A through 6C are sectional front views for showing operation of the pickup arm positioning mechanism.

The gimbal support mechanism 30 is illustrated in FIGS. 4 and 5. As shown therein, the gimbal support mechanism 30 comprises an outer frame 31 fixedly arranged within the pickup arm supporting block 6 and having a pair of mutually spaced upper and lower rims 31a and 31b. A centrally open inner frame 32 is suspensibly supported between the pair of upper and lower rims 31a and 31b via pivot bearings 33a and 33b screwed through the rims 31a and 31b, respectively. As a result, the inner frame 32 is horizontally swingable about a vertical axis passing through the center axes of the pivot bearings 33a and 33b. The pickup arm end 61 of the pickup arm assembly 60 extends through the center opening 34 of the inner frame 32 and is supported within the center opending of the inner frame 32 via pivot bearings 35a and 35b screwed through the vertical side portions of the inner frame 32, respectively. As a result, the pickup arm assembly 60 is swingable vertically about a horizontal axis passing through the center axes of the pivot bearings 35a and 35b. As already described, the inner frame 32 is horizontally swingably arranged with respect to the outer frame 31 fixedly mounted in the supporting block 6. Thus, the pickup arm assembly 60, particularly the pickup arm 63 is swingably supported by the supporting block 6 both in the horizontal and the vertical directions.

It should be noted that, as a substitute for the gimbal support mechanism 30, other type of conventional support structure such as a one point supporting structure may be employed.

The pickup arm positioning mechanism 90, is shown in FIGS. 5 and 6A through 6C, restricts the upper locked position of the pickup arm 63. The positioning mechanism 90 comprises a pair of adjusting screws 91a and 91b screwed vertically through the upper rim 31a of the outer frame 31 at a position forwardly of pivot bearing 33a. The adjusting screws 91a and 91b are located symmetrically about a vertical plane passing through the center axis of the pickup arm end 61 when the horizontal offset angle of the pickup arm 63 is substantially zero. The distance between the pair of adjusting screws 91a and 91b should be smaller than the outer diameter of the pickup arm end 61. The lower ends of the adjusting screws 91a and 91b are rounded so that they come into point contact with the round peripheral surface of the pickup arm end 61.

Figure 6A:
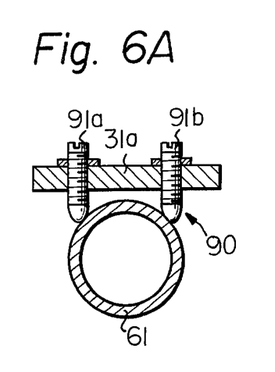

In the disposition shown in FIG. 6A, both adjusting screws 91a and 91b are screwed down relatively shallowly through the upper rim 31a of the outer frame 31 to an equal extent.

Figure 6B:
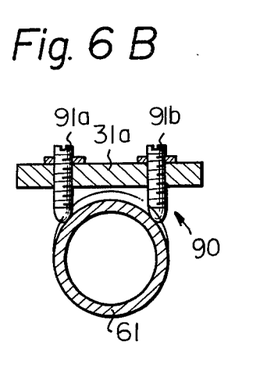

In the disposition shown in FIG. 6B, both adjusting screws 91a and 91b are screwed down relatively deeply through the upper rim 31a of the outer frame and to equal extent. In this condition, the pickup arm end 61 is pressed down at a position forwardly of the pivot bearings 35a and 35b (see FIG. 4), and the pickup arm 63 is swung downwardly from the position shown in FIG. 6A. The phantom lines indicate the position assumed by the pickup arm end 61 in the disposition shown in FIG. 6A.

Figure 6C:
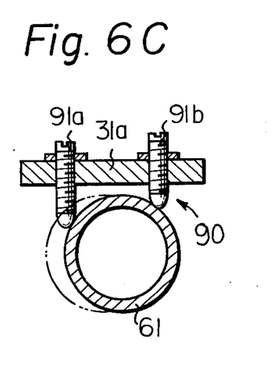

In the disposition shown in FIG. 6C, the left side adjusting screw 91a is screwed down relatively deeply through the upper rim 31a of the inner frame 31 whereas while the right side adjusting screw 91b is kept at the disposition shown in FIG. 6A. In this condition, the pickup arm end 61 is pressed towards the right at a position forwardly of the pivot bearings 33a and 33b (see FIGS. 4 and 5), and the pickup arm 63 swinging to the right from the position shown in FIG. 6A. The phantom lines indicate the position assumed by the pickup arm end 61 in the disposition shown in FIG. 6A. So, by adjusting the adjusting screws 91a and 91b, the angular posture of the pickup arm 63 can be finely adjusted when necessary. This adjustment will hereinafter explained in more detail in connection with the operation of the pickup arm lifting mechanism 40.

Figure 7:
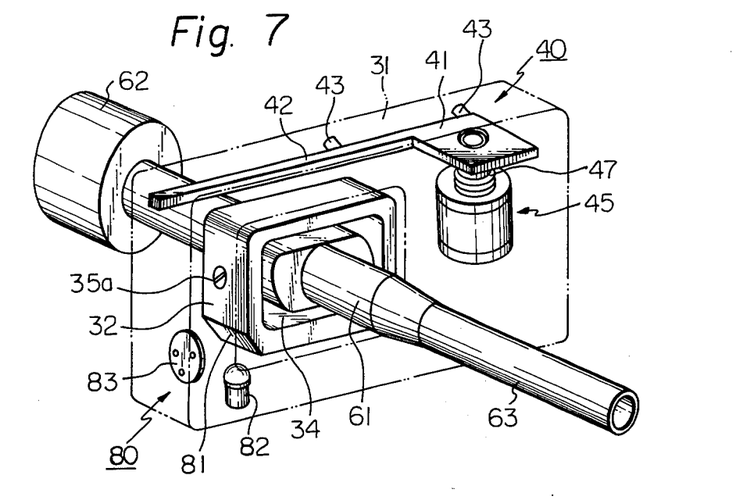
FIG. 7 is an explanatory perspective view for showing the pickup arm lifting mechanism and the pickup arm offset angle detecting mechanism.
Figure 8A:
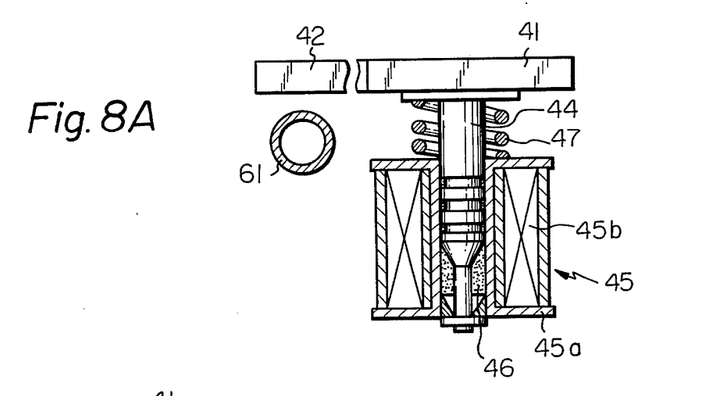
FIGS. 8A and 8B are partly sectional front views for showing operation of the pickup arm lifting mechanism.
Figure 8B:
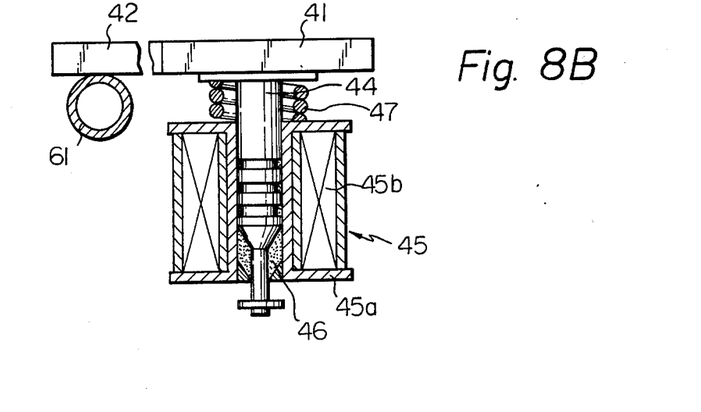

The pickup arm offset angle detecting mechanism 80 is illustrated in FIGS. 4 and 7, in which the detecting mechanism 80 includes a light reflecting surface 81 formed on one bottom corner of the inner frame 32 of the gimbal support mechanism 30. a light emitting source 82 mounted to the lower rim 31b of the outer frame 31 at a position just below the light reflecting surface 81 of the inner frame 32 and a photo-sensor 83 mounted on the outer frame 31 at a position adjacent the light reflecting surface 81 of the inner frame 32. The photo-sensor 83 may be a photo-transister which generates an electric signal corresponding to the magnitude of the light received. The light source 82 and the photo-sensor 83 are electrically connected, via the lead wires 16 (see FIG. 2), to an offset angle detecting circuit not shown. The offset angle detecting circuit preferably takes the form of a bridge circuit whose output electrically controls the servo-motor which is coupled, as already explained, to the driving mechanism 70 for the carriage 50. When a pickup arm supporting structure other than the above-described gimbal-type is used, the light reflecting surface 81 should be provided on a suitable portion of a member which is horizontally swingable with the pickup arm.

The arm lifting mechanism 40, shown in FIGS. 7 through 10, comprises a plate 41, an operating bar 42, a pair of projections 43 and a pair of screws. The plate 41 is vertically reciprocally arranged within the outer frame 31. The operating bar 42 extends sideways from the rear end of the plate 41 to cross over the pickup arm end 61 at a position somewhat rearwardly of the inner frame 32. The pair of projections 43 project rearwardly from the operating bar 42 to the vicinity of the rear wall of the outer frame 31 in order to prevent turning of the plate 41 in the horizontal plane. A metallic plunger 44, (FIG. 8B) provided with a number of annular peripheral grooves, extends downwardly from the bottom surface of the plate 41. An electro-magnetic solenoid 45 is mounted within the outer frame 31 in axial alignment with the plunger 44. The solenoid 45 includes a yoke 45a and a coil 45b wound around the yoke 45a. The lower portion of the plunger 44 is slidably received within the yoke 45a in a fluid tight fashion and a suitable highly viscous fluid 46 is confined in the space between the plunger 44 and the inner walls of the yoke 45a in order to dampen the sliding movement of the plunger 44. A compression spring 47 surrounds the upper portion of plunger 44 in the area between the bottom face of the plate 41 and the top face of the solenoid 45. The solenoid 45 is electrically connected to a suitable electric circuit via the lead wires 16 (see FIG. 2). When the pickup cartridge reaches the last groove of the record disc or is removed from the groove of the record disc for any reason, corresponding singals are generated in the electric circuit and the solenoid 45 is energized. The resulting electromagnetic force generated by the solenoid 45 biases the plunger 44 in the downward direction. This force overcomes the resistance of the viscous fluid 46 and the spring 47 and causes the plunger 44 to be slowly drawn into the solenoid yoke 45a. As a result of this motion, the operating bar 42 presses down the tone arm end 61 at a position rearwardly of gimbal support mechanism 30 as shown in FIG. 7 and causes the pickup arm 63 to swing upwardly about the gimbal support mechanism 30 to assume the upper locked posture set by the above-described pickup arm positioning mechanism 90. As the solenoid 45 is deenergized, the electromagnetic force disappears and the arm lifting mechanism 40 slowly resumes the disposition shown in FIG. 8A due to the repulsion of the spring 47.

The operation of the foregoing apparatus will now be described in detail.

When the pickup cartridge 64 is placed in a record groove a record groove, the longitudinal axis of pickup arm 63 is tangential to the record groove at the point of contact between the cartridge 64 and the record groove. During the proper operation of the record player, the pickup arm 63 is retained along an orientation normal to the predetermined linear track of the carriage 50 when the pickup cartridge 64 follows the record groove. During such correct operation of the record player, no offset signal is produced by the offset angle detecting mechanism 80. In this condition, the servo-mechanism for compensating the pickup arm deviation remains substantially inoperative.

When the orientation of pickup arm 63 (and therefore the orientation of cartridge 64) deviates from the true tangency to the record groove, the inner frame 32 of the gambal support mechanism 30 rotates about the pivot bearings 33a and 33b. As a result, the angle of reflection of the light generated by light source 82 and reflected off of light reflecting surface 81 of the inner frame 32 (see FIG. 7) is changed causing the magnitude of light received by the photo-sensor 83 to change. The detecting circuit coupled to the photo-sensor 83 detects this change and generates a corresponding offset signal which is transmitted to the servo-motor. The offset signal causes the servo-motor to run the belt 72 in the direction and over the distance required to cancel the above-described deviation of the pickup arm 63 from the true tangency, whereby the pickup arm 63 (and with it the) pickup cartridge are moved in the same direction over the same distance (see FIGS. 1 through 3). During this movement of the pickup arm, the position of the carriage 50 normal to the moving direction thereof can be very precisely constrained by means of the meshing engagement of the carriage bottom with at least one of the guide rails 2 and 3.

In accordance with the present invention, the gimbal support mechanism 30, the pickup arm lifting mechanism 40, the pickup arm offset angle detecting mechanism 80 and the pickup arm positioning mechanism 90 are all arranged on, and preferably situated substantially within the outer configuration of, the common pickup arm supporting block 6. As a result, the construction of the apparatus is made remarkably simple and compact. The absence of a number of connecting parts, which are necessary with the conventional construction, contributes to considerable reduction in noisy vibration of the mechanical parts, thereby enhancing the tone quality. Additionally, the reduction in the number of mechanical parts results in a reduction in the production cost of the apparatus.

The compact arrangement of the above-described mechanisms, which are related to the pickup arm assembly 60, within a common block 6 is accompanied with a further advantage. As already described in connection with FIG. 9, the level of the block 6 with respect to the carriage 50 can be very easily adjusted as desired by operating the adjusting screw 67. So, even when parts such as the turn table T and the pickup cartridge are replaced, the vertical positions of the mechanisms related to the pickup arm assembly 60 can be very easily adjusted together in accordance with the specification of the replaced new part or parts only by simply changing the level of the block 6 with respect to the carriage.

Provision of the pickup arm positioning mechanism 90 shown in FIGS. 5 and 6A through 6C is accompanied with an advantage that, when the pickup arm 63 is lifted by the lifting mechanism 40, the position of the pickup arm 63 in the horizontal plane is well regulated by the positioning mechanism 90 so as to keep the true tangency to the record groove. In other words, when lifted, the pickup arm 63 can be automatically locked to the position such that the deviation of the pickup arm from the true tangency to the record groove is substantially zero. Otherwise, when the pickup arm 63 is deviated from the true tangency in its upper locked position, the servo-mechanism for compensating such deviation shall operate despite of the locked disposition of the pickup arm 63 during the returning movement of this arm to its initial inoperative position so that the servo-mechanism or other driving mechanism is damaged. In addition, when the pickup arm 63 is replaced for any reason, the upper locked position of the newly replaced pickup arm can easily be regulated by operating the adjusting screws so as to keep the true tangency. Further, the positioning mechanism 90 effectively prevents unnecessary lateral swinging of the pickup arm 63 in the stand-by position, and during the returning movement of the tone arm 63 to its initial inoperative position.

I claim:

1. A disc player, comprising:
   (A) a turntable for rotatably supporting a disc about a predetermined axis;
   (B) a carriage moveable along a linear path spaced from said axis;
   (C) driving means for moving said carriage along said linear path;
   (D) a pickup arm, one end of said pickup arm adapted to carry a pickup cartridge;
   (E) a pickup arm supporting block;
   (F) a support mechanism coupled to said supporting block, said support mechanism supporting said pickup arm in such a manner that said pickup arm is pivotable in a horizontal and a vertical direction when said block is coupled to said carriage;
   (G) offset angle detection means coupled to said supporting block for generating a deviation signal representing the deviation of said pickup arm from an orientation substantially perpendicular to said linear path;
   (H) pickup arm lifting means coupled to said supporting block for pivoting said pickup arm in a direction which will cause said one end of said pickup arm to rise above said turntable responsive to an input signal applied thereto;
   (I) adjustable pickup arm positioning means coupled to said supporting block for cooperating with said pickup arm lifting means to hold said pickup arm in an upper locked position wherein said pickup arm is locked along a predetermined horizontal and vertical orientation; and (J) coupling means for releasably coupling said pickup arm supporting block to said movable carriage, said coupling means also for adjusting the level of said supporting block relative to said carriage.

2. An apparatus as claimed in claim 1 wherein said carriage is provided with a vertical hole and a threaded hole opening in said vertical hole and wherein said coupling means includes a bottom projection of said supporting block received in said vertical hole of said carriage and a fastening screw screwed into said threaded hole of said carriage to fix the vertical position of said bottom projection within said vertical hole at a required level.

3. An apparatus as claimed in claim 1 wherein said support mechanism comprises:

an outer frame fixedly mounted in said housing;
a centrally open inner frame through which said pickup arm assembly extends longitudinally;
means for pivotally supporting said inner frame with respect to said outer frame; and
means for pivotally coupling said pickup arm assembly to said inner frame in a second direction perpendicular to said first direction.

4. An apparatus as claimed in claim 3 wherein said supporting means for said inner frame includes a pair of upper and lower pivot bearings screwed substantially vertically through said outer frame in spaced axial alignment to each other whose points are in point contact with upper and lower faces of said inner frame.

5. An apparatus as claimed in claim 3 wherein said coupling means for said pickup arm assembly includes a pair of pivot bearings screwed substantially horizontally through said inner frame in spaced axial alignment to each other whose points are in point contact with both side faces of an arm body of said pickup arm assembly.

6. The apparatus as claimed in claim 3 wherein said offset angle detecting mechanism includes a light emitting source fixed to said outer frame, a light reflecting surface formed on the outer face of said inner frame and a photo-sensor fixed to said outer frame and electrically connected to an offset signal generating circuit, said light emitting source, said light reflecting surface and said photo-sensor being so arranged that light from said light emitting source is received by said photo-sensor via said light reflecting surface on said inner frame.

7. An apparatus as claimed in claim 1 wherein a portion of said pickup arm which extends into said supporting block includes a rounded upper surface and wherein said pickup arm positioning means comprises first and second screws extending into said supporting block towards said rounded upper surface, the distance said screws extend into said supporting block being adjustable from outside said supporting block, said screws being located at a position which will cause said screws to contact said rounded upper surface and lock said pickup arm in said predetermined orientation when said pickup arm lifting means pivots said pickup arm in a direction which causes said one end of said pickup arm to rise above said turntable.

8. An apparatus as claimed in claim 7 in which the ends of each of said adjusting screws which contact said rounded upper surface are rounded.

9. An apparatus as claimed in claim 1 wherein said pickup arm lifting means includes a plate, an operating bar extending horizontally from the rear end of said plate to cross over an arm body of said pickup arm at a portion rearwardly spaced from a portion supported by said support mechanism, means for urging said plate to move downwards in order to cause said one end of said pickup arm to rise above said turntable and means for resiliently returning said plate to its upper position.

10. An apparatus as claimed in claim 9 in which said urging means includes an electro-magnetic solenoid having a center yoke, a plunger projecting downwardly from said plate into said yoke and an electric circuit for energizing said solenoid.

11. An apparatus as claimed in claim 10 in which said returning means includes a compression spring inserted between said plate and said solenoid while winding around said plunger.

12. An apparatus as claimed in claim 10 further comprising means for damping the downward movement of said plunger in said solenoid yoke.

13. An apparatus as claimed in claim 12 in which said damping means includes a highly viscous fluid confined in said solenoid yoke.

* * * * *